United States Patent [19]

Olander et al.

[11] 4,335,234

[45] Jun. 15, 1982

[54] USE OF MANGANESE CHELATE TO OXIDATIVELY COUPLE PHENOLIC COMPOUND IN A SELF-PRECIPITATING SYSTEM

[75] Inventors: Walter K. Olander, Mt. Vernon, Ind.; Otto S. Zamek, Schenectady, N.Y.

[73] Assignee: General Electric Company, Pittsfield, Mass.

[21] Appl. No.: 89,999

[22] Filed: Oct. 31, 1979

[51] Int. Cl.³ .............................................. C08G 65/44
[52] U.S. Cl. ..................................... 528/214; 528/215
[58] Field of Search ................................ 528/215, 214

[56] References Cited

U.S. PATENT DOCUMENTS

| | | | |
|---|---|---|---|
| 3,220,979 | 11/1965 | McNelis | 260/47 |
| 3,306,874 | 2/1967 | Hay | 260/47 |
| 3,306,875 | 2/1967 | Hay | 260/47 |
| 3,573,257 | 3/1971 | Nakashio et al. | 260/47 |
| 3,956,242 | 5/1976 | Olander | 260/47 ET |
| 3,965,069 | 6/1976 | Olander | 260/47 ET |
| 3,972,851 | 8/1976 | Olander | 260/47 ET |
| 4,054,553 | 10/1977 | Olander | 260/47 ET |
| 4,075,174 | 2/1978 | Olander | 260/47 ET |

FOREIGN PATENT DOCUMENTS 776044 5/1972 Belgium .
2126434 12/1971 Fed. Rep. of Germany .

*Primary Examiner*—Maurice J. Welsh
*Attorney, Agent, or Firm*—Morgan, Finnegan, Pine, Foley & Lee

[57] ABSTRACT

Improved reaction rates and yields are provided if phenolic compounds are polymerized with basic manganese chelate catalysts in a self-precipitating system comprising an aromatic hydrocarbon and a water-immiscible alcohol.

17 Claims, 1 Drawing Figure

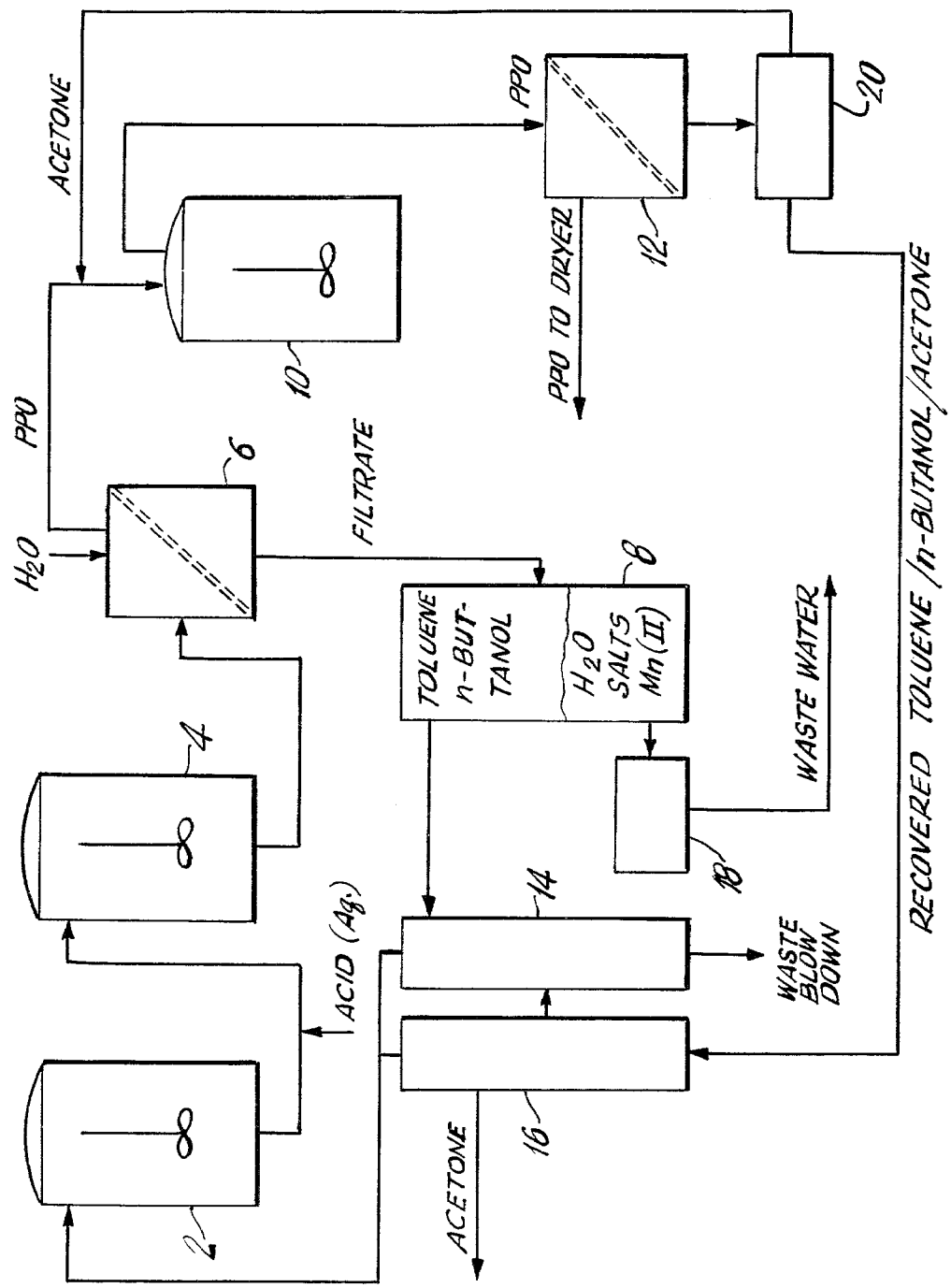

USE OF MANGANESE CHELATE TO OXIDATIVELY COUPLE PHENOLIC COMPOUND IN A SELF-PRECIPITATING SYSTEM

This invention pertains to the production of high molecular weight polyphenylene oxide polymers. More particularly, it relates to the use of a self-precipitating medium for improving the rates and polymer yields when catalyzing the oxidative coupling of a phenol compound with a manganese chelate catalyst.

BACKGROUND OF THE INVENTION

The concept of polymerizing phenols, e.g., 2,6-xylenol, in a self-precipitating system was first noted by Hay, U.S. Pat. Nos. 3,306,874 and 3,306,875. The products of the process are thermoplastic resins known as polyphenylene oxides (or polyphenylene ethers). Later workers reported work with self-precipitating systems, e.g., Belgian Pat. No. 776,044 and German Patent Publication No. P 21 26 434.6. The catalyst systems used in the foregoing work, in general, comprised CuCl with either N,N-dimethylamine, N-ethylamine, N,N-diethylamine; manganese bis(salicylaldehyde)-ethylenediamine with an ancillary amine or an alkali base; $CuSO_4$ with pyridine or cobalt bis(salicylaldehyde)ethylenediimine with pyridine.

Among the catalysts proposed for use in such polymerizations are manganese compounds, such as those disclosed in McNelis, U.S. Pat. Nos. 3,220,979; Nakashio, 3,573,257; and Olander, 3,956,242; 3,972,851; 3,965,069; 4,054,553; and 4,075,174. The disclosures of all of the above-mentioned patents and publications are incorporated herein by reference.

Although the above-mentioned disclosures suggest carrying out the reactions in a self-precipitating environment, and the Olander patents specifically state that with basic manganese chelates the self-precipitating system can comprise a mixture of an aromatic hydrocarbon with sufficient methanol to cause the polymer to precipitate, in actual practice many catalysts are inhibited because of a reduction in efficiency attributed to the high alcohol content of the reaction medium. Moreover, a substantially water-immiscible alcohol (as distinguished from methanol) seems to be critical to provide a high percentage of polymer solids in the reaction medium and the highest possible reaction rates.

It has now been discovered that a solvent system comprising an aromatic hydrocarbon and a substantially water-immiscible alcohol will serve to self-precipitate polyphenylene oxides in filterable form from reaction mixtures containing a basic manganese hydroxy oxime chelate catalyst. No additional precipitation step is required in the process. The total isolation procedure provides considerable cost savings in terms of polymer clean-up and solvent recovery.

The catalyst employed herein operates surprisingly efficiently under conditions under which the polymer product precipitates by itself. For example, manganese bis(benzoin oxime) functions at or phenol(2,6-xylenol)/Mn ratio of approximately 500–1000, considerably superior to the catalysts described in the references above. Also, the manganese complexes, especially with 2-phenyl-2-hydroxy-butan-3-one oxime is operable at 20-25 percent solids.

DESCRIPTION OF THE DRAWING

The drawing illustrates, in flow-diagram form, apparatus in which the present process can be carried out together with associated apparatus for recovering polyphenylene oxide product, catalyst components and solvent.

DESCRIPTION OF THE INVENTION

According to the present invention, there is provided in a process for the preparation of a polyphenylene ether resin which comprises the steps of (a) oxidatively coupling a phenolic monomer to form a polyphenylene oxide in the presence of a self-precipitating solvent comprising an aromatic hydrocarbon and an alcohol and a manganese chelate complex of the formula $$(L)_xMn$$

wherein L is a ligand derived from an ω-hydroxyoxime by conventional means, Mn is the transition metal manganese and x is at least equal to about 0.5, the improvement which comprises using as the alcohol component of said solvent as substantially water-immiscible alkanol of from about 4 to about 10 carbon atoms.

The composition of the reaction medium is variable within limits to be taught herein. The aromatic hydrocarbon can be selected from benzene, toluene, any of the isomeric xylenes, nitrobenzene, styrene, and the like. The alcohol component is substantially water-immiscible (i.e., capable of forming two layers with water) and can be straight or branched chain of from about 4 to about 10 carbon atoms. It will be recognized that t-butanol has the requisite number of carbon atoms, but the fact that it is infinitely soluble in water disqualifies it from selection. On the other hand, n-butanol is sparingly soluble in water, readily forms two layers therewith and is eminently suitable. Other suitable alcohols are, for example, n-pentanol, n-hexanol, 2-ethylhexanol, and the like.

In the process, a system comprising toluene and butanol is preferred and a weight ratio of about 1.5 to 1 of toluene/n-butanol has consistently given good results in terms of reaction times, catalyst activity, final intrinsic viscosity, and desirable particle texture of the polymer.

The phenolic monomer is selected from compounds having the formula:

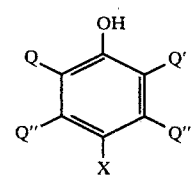

wherein X is a substituent selected from the group consisting of hydrogen, chlorine, bromine and iodine, Q is a monovalent substituenet selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q′ is as defined for Q and in addition may be halogen and Q″ are each as defined in Q and in addition may be halogen and Q″ are each as defined for Q′ and in addition hydrogen, with the proviso that Q,Q' and Q" are all free of a tertiary carbon atom.

The ligand that is used to form the manganese (II) chelate complex of the manganese (VII) chelate complex is of the formula:

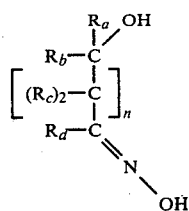

Formula I wherein $R_a$, $R_b$, $R_c$ and $R_d$ are selected from the group consisting of hydrogen, acyclic and cyclic organic radicals and n is a positive integer equal to 0 or 1. As used generally hereinafter reference to manganese (II) chelate will be understood to be applicable to manganese (VII) chelates unless a specific manganese compound is designated.

The manganese (II) chelates can be employed in a mono, bis, tris, tetrakis, etc. ligand form wherein one, two, three, four, etc. bidentate ligands, i.e. bidentate ligand being defined as the cyclic ring structure which arises from the union of a manganese (II) atom with a single oxime nitrogen atom and a single hydroxy oxygen atom associated with a single ω-hydroxyoxime ligand forming molecule, are associated with a single Mn (II) atom. Often manganese (II) chelates, preferably, are employed in their bis-bidentate form wherein two cyclic ring structures arise from the union of a single Mn (II) atom with two separate and distinct ω-hydroxyoxime molecules. Illustrative of Mn (II) chelates in mono-bidentate and bis-bidentate form are the chelates described by Formulas II and III, respectively, set out hereinafter.

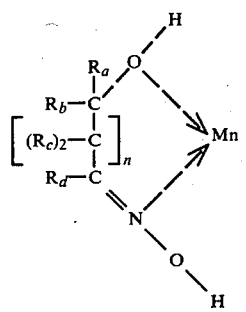

Formula II

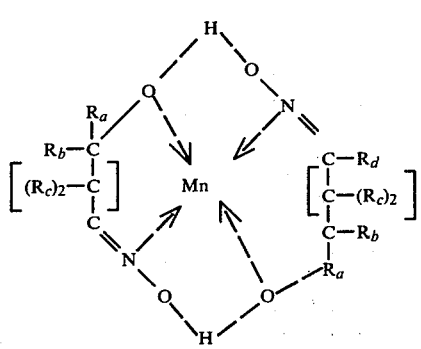

Formula III wherein $R_a$, $R_b$, $R_c$, $R_d$ and n are the same as defined hereinbefore.

The manganese (II) chelates can be prepared by any method known to those skilled in the art which introduces a divalent manganese ion, commonly referred to as Mn (II) or as Mn++, to a hydroxyoxime ligand group, i.e., any appropriate hydroxaldoxime or ketoxime of the Formula I, or any mixture thereof. In general, any amount of manganese (II) and ω-hydroxyoxime can be combined in the preparation of the Mn (II) chelate, however, an amount sufficient to form a Mn (II) bisbidentate ligand chelate ring type is preferably employed. The aforesaid aldoxime or ketoxime reactants can be prepared by any method well known to those skilled in the art, such as by the well known reactions of a hydroxylamine with α- or β-hydroxy-substituted aldehyde or ketone, respectively, or by the use of suitable oxime exchange techniques, such as those described in U.S. Pat. No. 3,124,613. In the preparation of the effective Mn (II) chelate, a manganese (II) ion associated with ω-hydroxyoxime donor ligand atoms can be derived from any manganese (II) compound which is at least partially dispersible or soluble in an ω-hydroxyoxime solution. Representative manganese (II) compounds include manganese (II) halides such as manganese (II) chloride (also known as manganous chloride), manganese (II) bromide, manganese (II) iodide, etc., as well as other manganese (II) compounds, such as manganese (II) carbonate, manganese (II) oxalate, manganese (II) sulfate, manganese (II) acetate, manganese (II) nitrate, manganese (II) phosphate, etc., including hydrated forms of such Mn (II) compounds. A preferred manganese (VII) compound is potassium permanganate.

A preferred method for preparing manganese (II) ω-hydroxyoxime chelates comprises the formation of a solution of a manganese (II) compound and a ligand forming hydroxy oxime molecule in a suitable solvent, such as n-butanol or a combination of n-butanol and an organic solvent such as chlorobenzene, toluene, xylene, etc. or mixtures thereof.

The possibility of formation of multiple rings, i.e., five- or six-membered chelate rings closely associated with hydrogen bonding is believed—especially with the five-membered chelate rings to markedly increase the stability and effectiveness of Mn (II) chelates in promoting the condensation of a phenol to a polyphenylene oxide.

The $R_a$, $R_b$, $R_c$ and $R_d$ substituents attached to the chelate ring carbon atoms of the manganese (II) ω-hydroxyoxime catalyst—other than hydrogen—can be any acyclic or cyclic organic radical, e.g., alkyl, cycloalkyl, aryl, aralkyl, alkaryl, alkcycloalkyl, cycloalkaryl radicals or combinations thereof, etc., including acyclic and cyclic radicals having electron-releasing constituents, such as amine, i.e., $NH_2$; monoalkylamine, i.e., $NHR^1$, dialkylamine, i.e., $N(R^1)_2$; hydroxy, i.e., OH; alkoxy, i.e., $OR^1$, and alkanoate, i.e., $OOCR^1$, $R^1$ in all cases being an alkyl group. Preferably, the $R_a$, $R_b$, $R_c$ and $R_d$ substituents associated with each five- or six-membered chelate ring is selected from acyclic and cyclic hydrocarbon radicals, more preferably at least one of the $R_b$ or $R_d$ substituents is selected from aromatic radicals, and even more preferably both of the $R_b$ and $R_d$ substituents are selected from aromatic radicals. Preferably, the acyclic and cyclic hydrocarbon radicals contain from 1 to about 30 carbon atoms. Representative of preferred hydrocarbon radicals are the following; methyl, ethyl, propyl, butyl, cyclobutyl, pentyl, cyclohexyl, cycloheptyl, decyl, eicosyl, triacontyl, phenyl, benzyl, methylbenzyl, α-methylbenzyl, methylphenyl, diphenylmethyl, naphthylxylxy, etc.

Representative of ω-hydroxyoxime ligand forming molecules that can be employed to prepare the Mn (II) chelates are the following compounds: benzoin oxime, anisoin oxime, paradimethylaminobenzoin oxime, furoin oxime, acetoin oxime, 2-methyl-2-hydroxy-butan-3-one oxime (also known as methylhydroxybutanone oxime), ω-hydroxyacetophenone oxime, 2-methyl-2-hydroxy-4-pentanone oxime, 2-phenyl-2-hydroxy-butan-3-one oxime (also known as phenylhydroxybutanone oxime), adipoin oxime, etc.

The preferred ω-hydroxyoxime ligand forming compounds that can be employed to prepare the Mn (II) complex catalyst are benzoin oxime; 2-phenyl-2-hydroxy-butan-3-one oxime; 2-methyl-2-hydroxy-butan-3-one oxime; and 2-salicylaldoxime.

The relative proportions of phenol to solvent can vary widely. Generally, presently acceptable economic reaction parameters comprise a mole proportion of 2,6-xylenol:solvent within the range of from about 20:80 to about 5:95. Presently preferred phenol:solvent mole proportions are within the range of from about 15:85 to about 10:90.

In order to carry out the Mn (II) chelate promoted self-condensation of phenol to polyphenylene oxide the self-condensation reaction must be carried out in a basic reaction medium, such as that provided by the presence of a strong alkali metal base, e.g., alkali metal hydroxides, alkali metal alkoxides, etc., or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide be employed to provide the strong basic reaction environment essential to the polymerization reaction, however, aqueous solutions, e.g., 50 percent, sodium hydroxide can be employed for convenience. The quantity of alkali metal base which is essential to the promotion of the self-condensation reaction can readily be determined without undue experimentation by those skilled in the art. In general, however, suitable phenol:alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol:alkali metal hydroxide mole ratio within the range of from about 14:1 to about 18:1.

In general, the mole proportions of phenol:Mn (II) chelate can vary widely to provide any desired—including minimum, maximum or optimum—degree of promotion of the reaction rate of phenols to polyphenylene oxide. Although not wishing to limit this invention by any theory, it is believed that the Mn (II) chelate reaction promoter functions as a true catalyst which remains essentially unconsumed or unchanged, e.g., a Mn (II) compound which is neither hydrolyzed nor dissociated due to thermal or other effects into a noncatalytic form during the self-condensation process. Apparently, the reason that the Mn (II) chelate behaves as a true catalyst is due to the unexpected stability of the Mn (II) five- or six-membered ω-hydroxyoxime chelate rings during preparation of the polyphenylene oxides.

It has been found that the Mn (II) chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of ω-hydroxyoxime ligand associated with the Mn (II) chelate, reaction rates comparable to those of the prior art can be obtained wherein the phenol to Mn (II) chelate mole ratio is within the range of from as low as about 100:1 to as high as about 3000:1, or even as high as about 6000:1. When the reaction is carried out under superatmospheric pressure, a pressure of for example 1 to 40 psig or 1 to 1000 psig may be employed.

In general, it is preferred that minimum quantities of Mn (II) chelate be employed for economic reasons and to provide a polyphenylene oxide containing a minimum amount of the manganese catalyst residue. Accordingly, it is preferred that the initial reaction media mole ratio of phenol:manganese (II) to be at least about 50:1, more preferably at least 100:1, and even more preferably at least 500:1, wherein this process is carried out at atmospheric or under oxygen pressure.

As used herein and in the annexed examples, wherever phenol:manganese (II) numerical ratios are described, it is to be understood that the numerical proportions describe the number of moles of phenol relative to the number of atoms of manganese (II) associated with the Mn (II) chelate independent of the chelate form, i.e., mono-bidentate, bis-bidentate, etc.

In general, the reaction temperature employed in the preparation of polyphenylene oxide in the presence of the Mn (II) chelate catalyst can be varied widely. Suitable polymerization temperatures generally fall within the range of from about 0° to about 50° C., preferably within the range of from about 10° to about 40° C., and more preferably within the range of from about 20° C. to 30° C. since generally optimum self-condensation reaction rates have been found to exist within the 20° C. to 30° C. temperature range. Mn (II) chelates having strong electronreleasing constiutents, e.g., dialkylamino radicals attached to $R_a$, $R_b$, $R_c$, $R_d$ aromatic substituent of Formulas II or III promote optimum reaction rates at temperatures at or above 35° C. Because the self-condensation reactions are exothermic in nature and the Mn (II) chelates are susceptible to thermal deactivation, it is generally desirable to program the addition of the majority of the phenolic monomeric reactant, and in some instances the Mn (II) chelate catalyst, during their initial contact within the reaction media. This programmed addition permits a suitable reaction temperature profile to be obtained whereby the reaction is maintained within a temperature range suited to optimum catalyst efficiency and optimum yields of polyphenylene oxide resin. In addition, more latitude with regard to the upper limits of the reaction temperature range can be obtained wherein the process is carried out at superatmospheric pressures, e.g., 1 to 40 psig, 1 to 1000 psig, or even higher pressures. In the event that the self-condensation reaction is discontinued or interrupted due to deactivation of the Mn (II) chelate at elevated temperatures, the reaction can be resumed in a normal fashion by reducing the temperatures of reaction medium and adding thereto additional manganese (II) chelate catalyst in the amounts required to initiate and maintain the desired catalyst efficiency.

Amines may be used in the process in preferred features. The purpose of the added amine is intended to improve the quality of the polyphenylene oxide resin, especially when it has been formulated into compositions with styrene resins. Conveniently, the amine will be a primary or secondary aliphatic amine or a bis-secondary diamine or a mixture thereof. Preferably, the amine will comprise di-n-butylamine, n-octyl amine or 1,8-octanediamine. The use of these to improve the catalytic efficiency of the manganese chelates is known from the above-mentioned Olander patents, U.S. Pat. Nos. 3,972,851; 4,075,174; etc.

The polyphenylene oxides made in self-precipitating processes will be contaminated with catalyst, alkali (and/or amine) and various quinone color bodies. A procedure is contemplated to remove such contaminants from the polymer. Referring to the drawing, polymer from reactor 2 is mixed with aqueous acid, usually sulfuric acid or hydrochloric acid, acetic acid, and the like, in tank 4 to neutralize the base initially present. After an adequate contact period, the slurry of polymer and acid is transferred to filter 6 and the wet polyphenylene oxide cake is washed on filter 6 with water, the combined organicaqueous filtrates being transferred to decanter 8. The polyphenylene oxide wet cake is next transferred to re-slurry tank 10 and re-slurried with a small amount of polar solvent, e.g., acetone, to extract residual quinones (e.g., tetramethyldiphenoquinone) and other color bodies absorbed on the polymer. The polyphenylene oxide wet cake is separated on filter 12 and sent to a conventional drier, and it has a suitable light yellow color and is virtually free of manganese and sodium. To complete the cycle, toluene and n-butanol are rectified in towers 14 and 16 and returned to reactor 2, and the manganese/inorganic salts are disposed of to waste water. Toluene/n-butanol and acetone are collected in solvent purification vessel 20 and re-cycled, too.

The acid neutralization step is desirable for two reasons. In addition to removing most of the alkali present in the polymer, it re-establishes hydroxyl end groups on the polymer instead of ionic groups present under basic conditions.

DESCRIPTION OF THE PREFERRED EMBODIMENTS

The following examples illustrate the process of this invention and are not to be construed to limit the claims in any manner whatsoever.

A one gallon reactor equipped with an internal cooling coil, oxygen inlet tube, monomer/solvent addition system, temperature sensors and mechanical agitator is employed.

The catalyst is prepared by dissolving $MnCl_2$ and the designated chelate in n-butanol. Unless otherwise indicated in the tables, the polymerizations are run using bulk xylenol addition (i.e., all at once). The results summarized in the tables are obtained using a toluene/n-butanol weight ratio of 1.5:1. The reactions are quenched by adding aqueous acid generally at a four-fold excess calculated on the amount of NaOH initially present. The precipitated polyphenylene oxide (also known as poly(2,6-dimethyl-1,4-phenylene ether)) is filtered and the wet cakes are washed with water and either acetone or methanol. In the Tables, I.V. means intrinsic viscosity of the polymer product in deciliters/gram as measured in chloroform at 30° C.

EXAMPLES 1-4

A series of polymerizations is carried out using benzoin oxime as the chelating component in the catalyst and including di-n-butylamine in the reaction mixture. The conditions used and the results obtained are summarized in Table 1.

TABLE 1

SELF-PRECIPITATING POLYMERIZATION RESULTS USING $Mn(benzoin\ oxime)_2$

| Example | % Solids | Catalyst Ratio | 2,6-Xylenol (g) | Toluene (g) | n-butanol (g) | $MnCl_2$ (g) | Amine (g) | Chelate (g) | NaOH, 50% aq. (g) | Time (min) | I.V. |
|---|---|---|---|---|---|---|---|---|---|---|---|
| 1 | 10 | 500 | 30 | 162 | 108 | .0618 | di-n-butyl 0.3 | benzoin oxime 0.2233 | 1.2 | 120 | 0.56 |
| 2 | 15 | 500 | 30 | 102 | 68 | .0618 | di-n-butyl 0.3 | benzoin oxime 0.2233 | 1.2 | 174 | 0.51 |
| 3 | 15 | 250 | 15 | 51 | 34 | .0618 | di-n-butyl 0.25 | benzoin oxime 0.2233 | 0.6 | 120 | 0.50 |
| 4 | 20 | 500 | 20 | 48 | 32 | .0412 | di-n-butyl 0.2 | benzoin oxime 0.1490 | 0.8 | 110 | 0.30 |

EXAMPLES 5-8

The general procedure of Examples 1-4 is repeated, substituting different amines and chelates. The conditions used and the results obtained are set forth in Table 2:

TABLE 2

SELF PRECIPITATING POLYMERIZATIONS-EFFECT OF DIFFERENT AMINES AND CHELATES

| Example | % Solids | Chelate | Ratio(2,6-xylenol/metal) | Amine | Rx Time (min) | I.V. Powder | Work-Up |
|---|---|---|---|---|---|---|---|
| 5 | 15 | Benzoin oxime | 500/1 | n-Octylamine | 170 | 0.577 | $H_2SO_4$ quench; water, acetone wash |
| 6 | 15 | Benzoin oxime | 500/1 | 1,8-Octanediamine | 170 | 0.551 | $H_2SO_4$ quench; water, acetone wash |
| 7 | 15 | $CH_3$—Butox* | 300/1 | di-n-butylamine | 170 | 0.404 | $H_2SO_4$ quench; water, acetone wash |

TABLE 2-continued
SELF PRECIPITATING POLYMERIZATIONS-EFFECT OF DIFFERENT AMINES AND CHELATES

| Example | % Solids | Chelate | Ratio(2,6-xylenol/metal) | Amine | Rx Time (min) | I.V. Powder | Work-Up |
|---|---|---|---|---|---|---|---|
| 8 | 15 | Salicyl-aldoxime | 100/1 | di-n-butylamine | 170 | 0.443 | $H_2SO_4$ quench; water, acetone wash |

*Butox - 2-hydroxy-2-methyl-butan-3-one oxime

EXAMPLES 9-15

The general procedure of Examples 1-4 is repeated, substituting programmed monomer addition (PMA) in some instances and using a ratio of 500/1 of 2,6-xylenol to manganese. The conditions used and the results obtained are set forth in Table 3:

TABLE 3
SELF-PRECIPITATING SYSTEM-EFFECT OF PROGRAMMED MONOMER ADDITION

| Example | % Solids | Chelate | PMA | Rx Time (min) | I.V. Powder | Remarks |
|---|---|---|---|---|---|---|
| 9 | 15 | Benzoin oxime | ½ monomer over 15.5 min. | 165 | 0.451 | HOAC quench; water, acetone wash |
| 10 | 15 | Benzoin oxime | ¾ monomer over 39 min. | 160 | 0.369 | $H_2SO_4$ quench; water, acetone wash |
| 11 | 15 | Benzoin oxime | Bulk | 180 | 0.338 | ½ the catalyst added at T = 1 hour, $H_2SO_4$ quench; water, acetone wash |
| 12 | 20 | φ-Butox<sup>a</sup> | Bulk | 180 | 0.4352 | 1/1:metal/chelate, $H_2SO_4$ quench; water, acetone wash |
| 13 | 15 | Benzoin oxime | ½ monomer over 29.5 min. | 180 | 0.438 | 1/1:metal/chelate, $H_2SO_4$ quench; water, acetone wash |
| 14 | 20 | φ-Butox | ½ monomer over 30 min. | 180 | 0.401 | 1/1:metal/chelate, $H_2SO_4$ quench; water, acetone wash |
| 15 | 25 | φ-Butox | Bulk | 180 | 0.541 | $H_2SO_4$ quench; water, acetone wash |

<sup>a</sup>φ-Butox = 2-hydroxy-2-phenyl-butan-3-one oxime

Although the foregoing examples have shown various modifications of the present invention, other variations are possible in light of the above teachings. It is, therefore, to be understood that changes may be made in the particular embodiments which are within the full intended scope of the appended claims.

We claim:

1. In a process for the preparation of a polyphenylene ether resin which comprises the steps of
oxidatively coupling a phenolic monomer to form a polyphenylene oxide in the presence of a self-precipitating solvent comprising an aromatic hydrocarbon and an alcohol and a manganese chelate complex of the formula (L)<sub>x</sub>Mn wherein L is a ligand derived from an ω-hydroxyoxime, Mn is the transition metal manganese and x is at least equal to about 0.5, the improvement which comprises using as the alcohol component of said solvent a substantially water-immiscible alkanol of from about 4 to about 10 carbon atoms.

2. A process as defined in claim 1 wherein said aromatic hydrocarbon is selected from benzene, toluene, chlorobenzene, xylene, nitrobenzene, styrene or a mixture of any of the foregoing.

3. A process as defined in claim 1 wherein said alkanol is n-butanol.

4. A process as defined in claim 1 wherein said self-precipitating solvent comprises toluene as the aromatic hydrocarbon and n-butanol as the alcohol.

5. A process as defined in claim 4 wherein the weight ratio of toluene to n-butanol is about 1.5 to 1.

6. A process as defined in claim 1 wherein the phenolic monomer is selected from compounds having the formula:

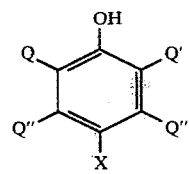

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenol nucleus; and Q' is as defined for Q, and in addition may be halogen and Q" are each as defined for Q', and in addition hydrogen, with the proviso that Q, Q' and Q" are all free of a tertiary carbon atom.

7. A process as defined in claim 1 wherein the ligand of the manganese chelate complex is of the formula:

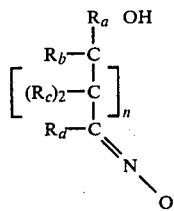

wherein $R_a$, $R_b$, $R_c$ and $R_d$ are selected from the group consisting of hydrogen, acyclic and cyclic organic radicals and n is a positive integer equal to 0 or 1.

8. A process as defined in claim 6 wherein the phenolic monomer is 2,6-xylenol.

9. A process as defined in claim 1 wherein the manganese chelate complex is manganese benzoin oxime.

10. A process as defined in claim 1 wherein the manganese chelate complex is manganese 2-phenyl-2-hydroxybutan-3-one oxime.

11. A process as defined in claim 1 wherein the manganese chelate complex is manganese 2-methyl-2-hydroxybutan-3-one oxime.

12. A process as defined in claim 1 wherein the manganese chelate complex is manganese 2-salicyl-aldoxime.

13. A process as defined in claim 1 wherein the reaction mixture further includes a primary or a secondary aliphatic amine, a bis-secondary diamine, or a mixture thereof.

14. A process as defined in claim 13 wherein said aliphatic amine is di-n-butylamine or n-octylamine.

15. A process as defined in claim 13 wherein said bis-secondary diamine is 1,8-octanediamine.

16. A process as defined in claim 1 wherein said phenolic monomer is added to the reaction mixture during the polymerization reaction.

17. A process as defined in claim 1 wherein the process is carried out under a positive oxygen pressure.

* * * * *

UNITED STATES PATENT AND TRADEMARK OFFICE
CERTIFICATE OF CORRECTION

PATENT NO. : 4,335,234
DATED : June 15, 1982
INVENTOR(S) : Walter K. Olander, et al.

It is certified that error appears in the above—identified patent and that said Letters Patent is hereby corrected as shown below:

In column 11 delete the chemical formula on lines 3-11 and insert in place thereof the following:

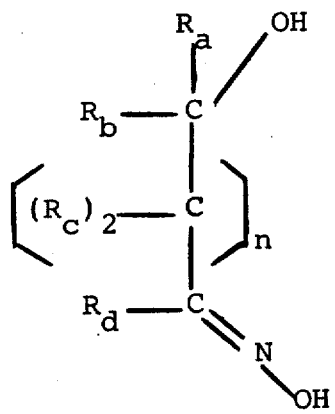

Signed and Sealed this

Twenty-sixth Day of October 1982

[SEAL]

Attest:

GERALD J. MOSSINGHOFF

Attesting Officer  Commissioner of Patents and Trademarks